(12) United States Patent
Hill

(10) Patent No.: US 10,836,623 B2
(45) Date of Patent: Nov. 17, 2020

(54) LOCKING NECK GRIPPER

(71) Applicant: William P. Young Company, Plymouth, MI (US)

(72) Inventor: Kenneth E. Hill, Livonia, MI (US)

(73) Assignee: William P. Young Company, Plymouth, MI (US)

( * ) Notice: Subject to any disclaimer, the term of this patent is extended or adjusted under 35 U.S.C. 154(b) by 191 days.

(21) Appl. No.: 16/311,291

(22) PCT Filed: Jul. 10, 2017

(86) PCT No.: PCT/US2017/041362
§ 371 (c)(1),
(2) Date: Dec. 19, 2018

(87) PCT Pub. No.: WO2018/013478
PCT Pub. Date: Jan. 18, 2018

(65) Prior Publication Data
US 2019/0210858 A1    Jul. 11, 2019

Related U.S. Application Data

(60) Provisional application No. 62/360,706, filed on Jul. 11, 2016.

(51) Int. Cl.
*B67C 3/24* (2006.01)
*B65G 47/90* (2006.01)

(52) U.S. Cl.
CPC ............ *B67C 3/242* (2013.01); *B65G 47/904* (2013.01); *B65G 2201/0247* (2013.01)

(58) Field of Classification Search
CPC ............ B67C 3/242; B65G 2201/0247; B65G 47/904

USPC .................................................... 294/94, 116
See application file for complete search history.

(56) References Cited

U.S. PATENT DOCUMENTS

| 3,590,982 A | 7/1971 | Banyas |
| 3,802,942 A | 4/1974 | Amberg et al. |
| 3,860,104 A | 1/1975 | Strauss |
| 3,944,058 A * | 3/1976 | Strauss ..................... B60P 1/28 198/377.07 |

(Continued)

FOREIGN PATENT DOCUMENTS

| DE | 102007054388 A1 | 5/2009 |
| WO | 2011/121007 | 10/2011 |

OTHER PUBLICATIONS

International Search Report, PCT/US2017/041362, dated Sep. 29, 2017.
EP Search Report EP 17828245, dated Apr. 6, 2020.

*Primary Examiner* — Paul T Chin
(74) *Attorney, Agent, or Firm* — Fishman Stewart PLLC

(57) ABSTRACT

A gripper assembly for gripping a portion of a container may include a spindle configured to rotate about a vertical axis. The assembly may also include an actuating plate disposed on or about the spindle. The actuating plate may be configured to actuate toward a central shaft in response to a force applied to a first cam follower. The assembly may also include a gripper configured to at least one of open and close in response to the actuating plate being actuated toward the central shaft and a locking cam configured to contact the first cam follower and in at least one position to limit movement of the actuating plate toward the central shaft.

20 Claims, 12 Drawing Sheets

(56) References Cited

U.S. PATENT DOCUMENTS

| | | | |
|---|---|---|---|
| 2004/0151798 A1 | 8/2004 | Nava | |
| 2005/0092390 A1* | 5/2005 | Krulitsch | B67C 3/242 |
| | | | 141/144 |
| 2005/0103599 A1 | 5/2005 | Hartness et al. | |
| 2008/0038099 A1* | 2/2008 | Burgmeier | B67C 3/242 |
| | | | 414/222.01 |
| 2011/0064555 A1* | 3/2011 | Stoiber | B65G 47/847 |
| | | | 414/751.1 |
| 2014/0251754 A1* | 9/2014 | Hoellriegl | B65G 29/00 |
| | | | 198/345.1 |
| 2019/0276175 A1* | 9/2019 | Nava | B25J 15/0226 |

* cited by examiner

LOCKING NECK GRIPPER

CROSS-REFERENCE TO RELATED APPLICATIONS

This application claims priority to International Patent Application No. PCT/US2017/041362, filed Jul. 10, 2017, which claims priority to U.S. Provisional Application Ser. No. 62/360,706, filed Jul. 11, 2016, the contents of which are incorporated by reference in their entirety entireties.

TECHNICAL FIELD

The present disclosure relates to a container grippers, including a system for gripping and locking a portion of a container, such as a bottle neck.

BACKGROUND

In the packaging industry, packages, such as bottles, may be washed, rinsed, sterilized, shaped, and/or printed on before the bottles are filled with a product. The bottles may be manipulated by a bottle conveyor or handling device. For example, the bottle conveyor or handling device may adjust a position and/or orientation of the bottle and/or transport the bottle to various stations within a packaging facility. The various stations may include a washing station, a rinsing station, a sterilization station, a shaping station, a printing station, and/or other suitable stations.

Typically, a bottle conveyor or handling device includes a gripper assembly. The gripper assembly may be configured to grip a portion of a bottle, such as a bottle neck. The gripper assembly may include grippers configured to grip a bottle neck. For example, the grippers may include a set of jaws that may be selectively moveable between an opened and a closed position. The jaws may be controlled and/or moved by various suitable means. For example, the jaws may be electrically or pneumatically controlled. Electrical and/or pneumatic control systems may require various electrical and/or pneumatic components to be disposed on, coupled to, and/or attached to the bottle conveyor or handling device. Among other things, the electrical and/or pneumatic components may limit a range of motion of the bottle conveyor or handling device and/or get in the way of various components of the bottle conveyor or handling device and/or various components of the packing facility. Accordingly, a gripper assembly configured to mechanically control grippers may be desirable.

SUMMARY

A gripper assembly for gripping a portion of a container may include a spindle configured to rotate about a vertical axis. The assembly may also include an actuating plate disposed on or about the spindle. The actuating plate may be configured to actuate toward a central shaft in response to a force applied to a first cam follower. The assembly may also include a gripper configured to at least one of open and close in response to the actuating plate being actuated toward the central shaft and a locking cam configured to contact the first cam follower and in at least one position to limit movement of the actuating plate toward the central shaft.

In other embodiments, a gripper assembly for gripping a portion of a container may include a spindle configured to rotate about a vertical axis. The assembly may also include an actuating plate disposed on or about the spindle. The actuating plate may be configured to actuate toward a central shaft in response to a force applied to a first cam follower. A gripper may be configured to grip a portion of a container. The gripper may include a pair of jaws configured to at least one of open and close in response to the actuating plate being actuated toward the central shaft. A locking cam may be configured to contact the first cam follower and may limit movement of the actuating plate toward the central shaft.

DETAILED DESCRIPTION

In the packaging industry, containers, such as bottles, may be washed, rinsed, sterilized, shaped, and/or printed on before the containers and/or bottles are filled with a product. The containers and/or bottles may be manipulated and/or positioned by a bottle conveyor or handling device. For example, and without limitation, the bottle conveyor or handling device may adjust a position of the container and/or bottle and/or transport the container and/or bottle to various stations. The various stations may include a bottle loading station, a bottle unloading station, a washing station, a rinsing station, a sterilization station, a shaping station, a printing station, and/or other suitable stations. The bottle conveyor or handling device may include a gripping assembly configured to grip at least a portion of the container and/or bottle while the bottle conveyor or handling device conveys the gripper assembly through the packaging facility.

Figure 1:
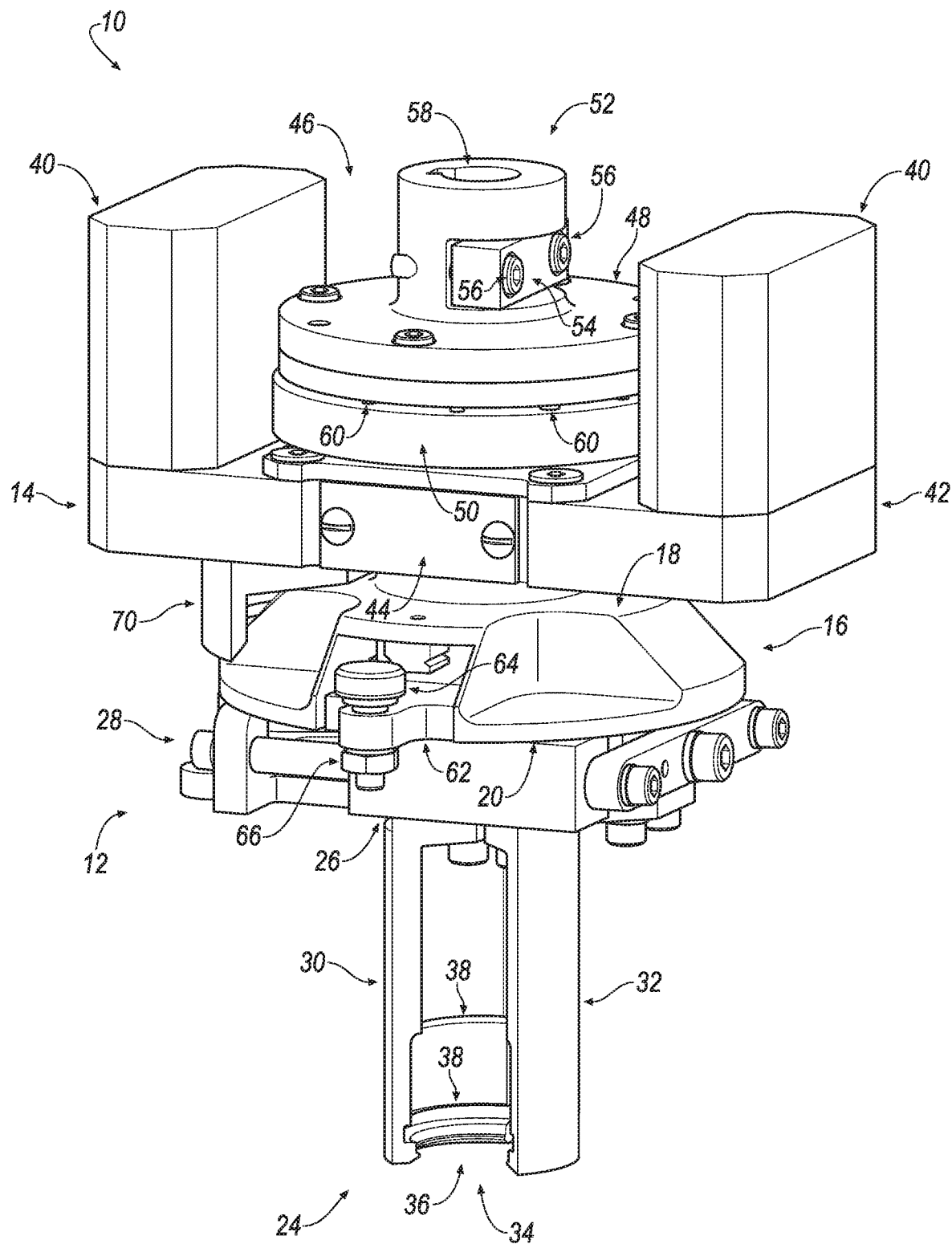
FIG. 1 generally illustrates a perspective view of an embodiment of a gripper assembly generally illustrating aspects of the present disclosure.
Figure 2:
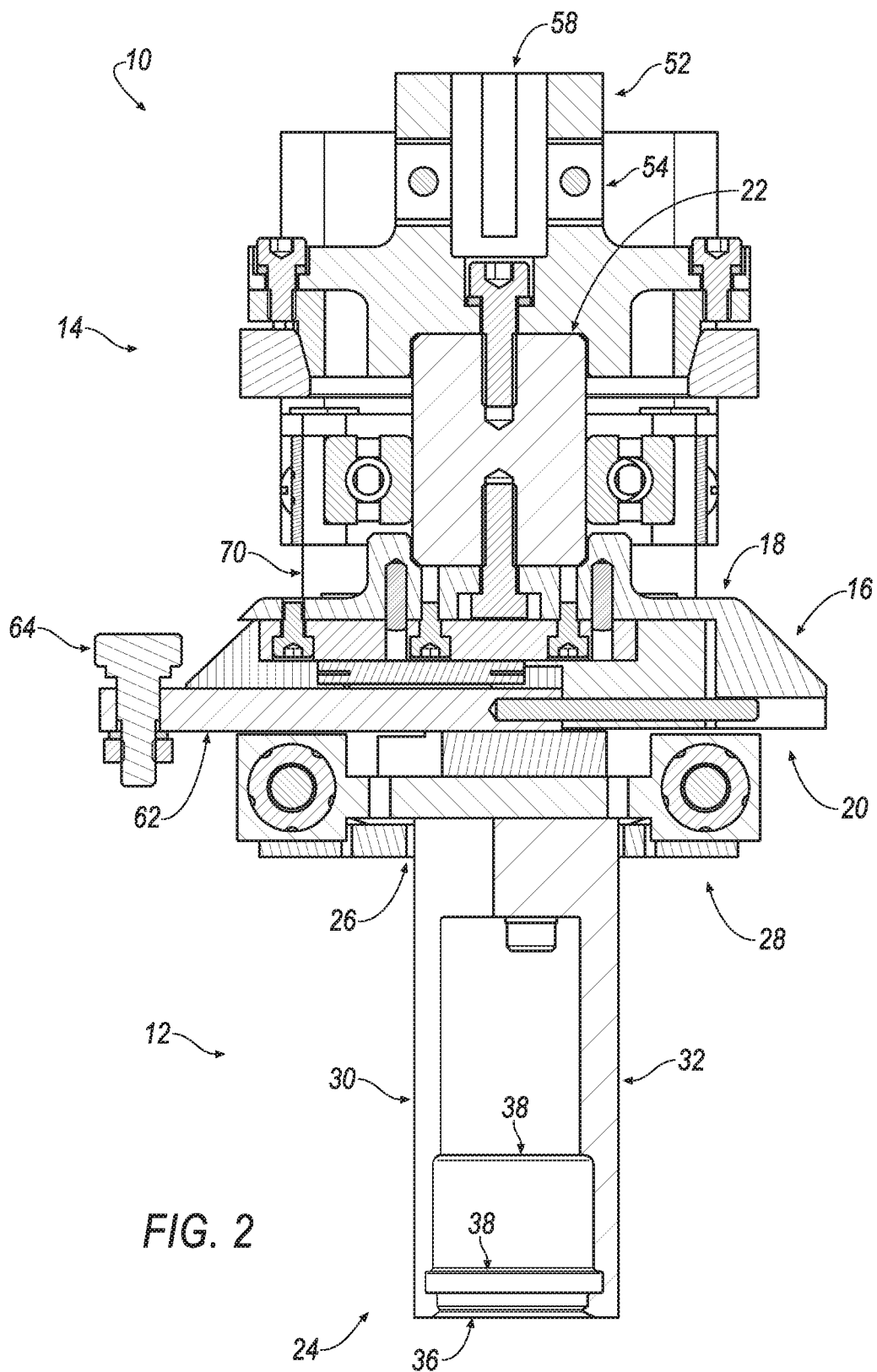
FIG. 2 generally illustrates a cross-sectional view of an embodiment of a gripper assembly generally illustrating aspects of the present disclosure.
Figure 3:
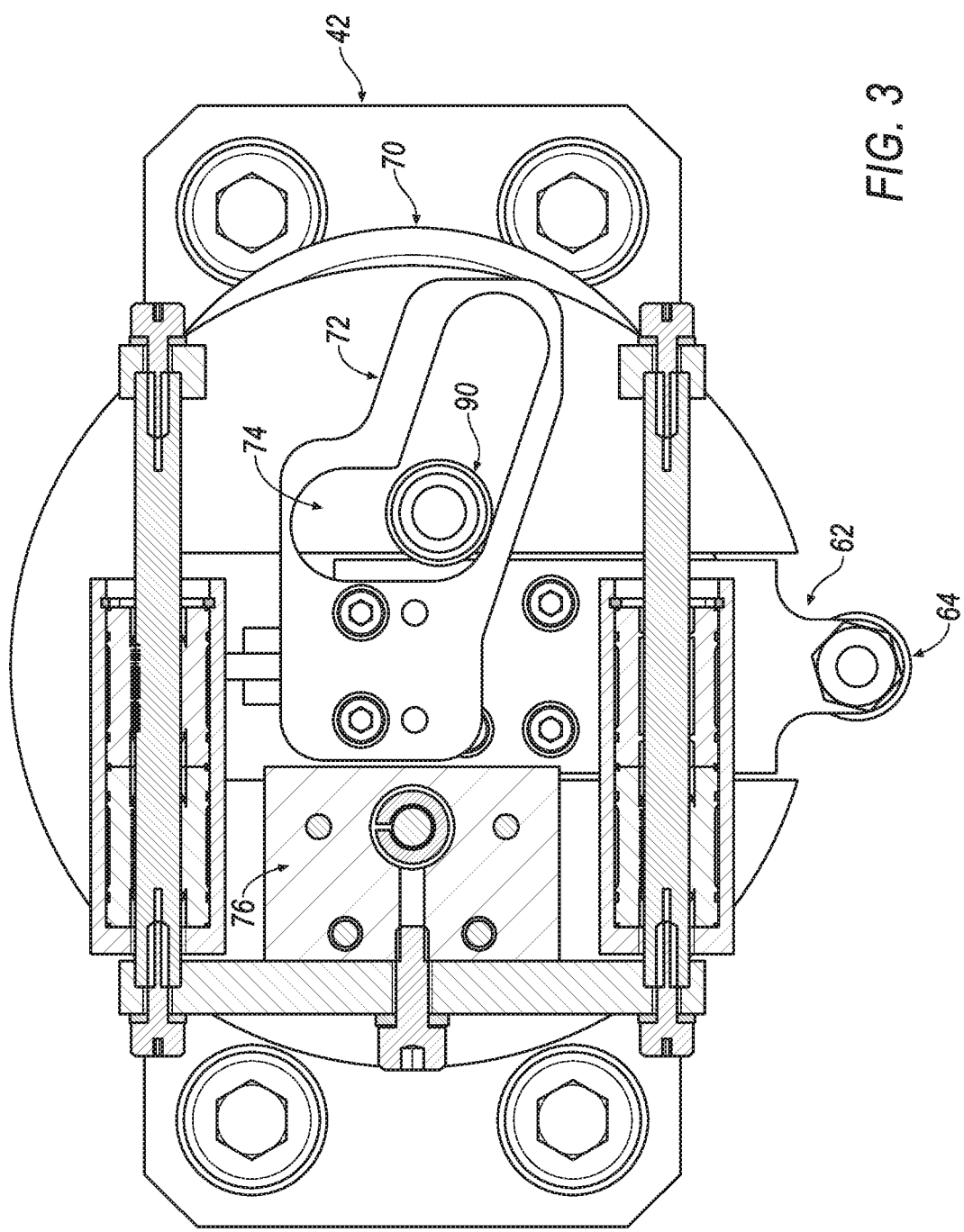
FIG. 3 generally illustrates a cross-sectional top view of an embodiment of a gripper assembly generally illustrating aspects of the present disclosure.

Referring to FIGS. 1-3, an embodiment of a gripping assembly 10 is generally illustrated. In embodiments, the assembly 10 may include a first or lower portion 12 and a second or upper portion 14. The first portion 12 may include a spindle 16. The spindle 16 may include a first face 18 and a second face 20. In embodiments, the spindle 16 may rotate about a central shaft 22, as generally illustrated in FIG. 2. The assembly 10 may include one or more grippers 24. A gripper 24 may include an attachment end 26. The attachment end 26 may be attached and/or connected to a portion of a bracket 28. In embodiments, the bracket 28 may be attached and/or connected to the second face 20 of the spindle 16. The bracket 28 may be configured to rotate substantially in tandem with the spindle 16.

In embodiments, the gripper element 24 may include a first jaw 30 and a second jaw 32. The first jaw 30 may be attached and/or connected to a portion of a bracket 28. The first jaw 30 may be attached and/or connected to a portion of the bracket 28, for example, via one or more fasteners. The second jaw 32 may be attached and/or connected to a portion of the bracket 28. The second jaw 32 may be attached and/or connected to a portion of the bracket 28, for example, via one or more fasteners. The fasteners may comprise, but are not limited to, socket head cap screws, screws, pins, dowel pins, rivets, weld joints, and/or other suitable fasteners.

In embodiments, the gripper 24 may include a receiving portion 34. The receiving portion 34 may be disposed at an end of the gripper 24 that is opposite the attachment end 26. The receiving portion 34 may include an opening 36. The opening 36 may be configured to receive a portion of a container and/or bottle. For example, and without limitation, the opening 36 may be configured to receive a portion of a bottle neck.

In embodiments, the receiving portion 34 may include a plurality of retainers 38. The retainers 38 may be disposed on one or more of a first jaw 30 and a second jaw 32. In embodiments, the retainers 38 may comprise a one or more recesses and/or protrusions. For example, and without limitation, the retainers 38 may include a plurality of threads configured to operationally or functionally mate with a plurality of threads associated with a bottle neck. In this manner, a bottle neck may fit securely and/or snuggly within the opening 36.

In embodiments, the gripper 24 may be an interchangeable component of the assembly 10. For example, and without limitation, the gripper 24 may be detached and/or removed from the bracket 28. Another gripper, which may be a substitute gripper, may then be attached and/or connected to the bracket 28. The substitute gripper may include a plurality of recesses and/or protrusions configured to receive and/or mate with a portion of a container and/or bottle. For example, and without limitation, the substitute gripper may be configured to operationally or functionally mate with a different size and/or configured bottle neck than the gripper 24. That is, by permitting use of various grippers, the assembly 10 may be configured to grip containers and/or bottles having various shapes, sizes, and/or characteristics.

In embodiments, the assembly 10 may include one or more standoffs 40. The one or more standoffs 40 may extend away from a portion of a bearing plate 42. The one or more standoffs 40 may be configured to attach and/or connect the assembly 10 to a container and/or bottle conveyance system. The bearing plate 42 may be configured to support and/or connect the assembly 10 when the assembly 10 is attached and/or connected to a conveyance or handling system. For example, and without limitation, the one or more standoffs 40 may be received by and/or connected to a bottle conveyor or handling device. The bottle processing line may include various bottle processing stations. For example, and without limitation, the bottle processing stations may include a bottle loading station, a bottle unloading station, a rinse station, a printing station, and/or other suitable processing stations. The assembly 10 may be conveyed through a bottle processing line when the assembly 10 is received by and/or connected to the bottle conveyor or handling device. The bearing plate 42 may include a number plate 44. The number plate 44 may include an identifier associated with the assembly 10. For example, and without limitation, the identifier may include a serial number, station number, or other suitable identifiers.

In embodiments, a central shaft 22 may pass through an aperture disposed in the bearing plate 42. The central shaft 22 may extend vertically between the first portion 12 and the second portion 14. For example, and without limitation, a first end of the central shaft 22 may be attached and/or connected to the spindle 16. The first end of the central shaft 22 may be disposed at or near the second face 20 of the spindle 16. In embodiments, the assembly 10 may include an encoder 46. The encoder 46 may include an encoder ring mount 48 and an encoder ring 50. An encoder ring mount 48 may be configured to support an encoder ring 50. For example, and without limitation, an encoder ring 50 may be attached and/or connected to the encoder ring mount 48 via one or more fasteners. The fasteners may include, but are not limited to, socket head cap screws, screws, pins, dowel pins, rivets, weld joints, and/or other suitable fasteners.

The encoder ring mount 48 may include a shaft collar 52. A second end of the central shaft 22 may extend vertically through a bearing plate 42, an encoder ring 50, and an encoder ring mount 48. The second end of the central shaft 22 may extend into the shaft collar 52. The shaft collar 52 may include one or more clamps 54. The one or more clamps 54 may be configured to secure the central shaft 22 to the shaft collar 52. For example, and without limitation, a clamp 54 may secure the central shaft 22 to the shaft collar 52 via one more fasteners 56. The fasteners 56 may include, but are not limited to, socket head cap screws, screws, pins, dowel pins, rivets, weld joints, and/or other suitable fasteners.

Figure 6:
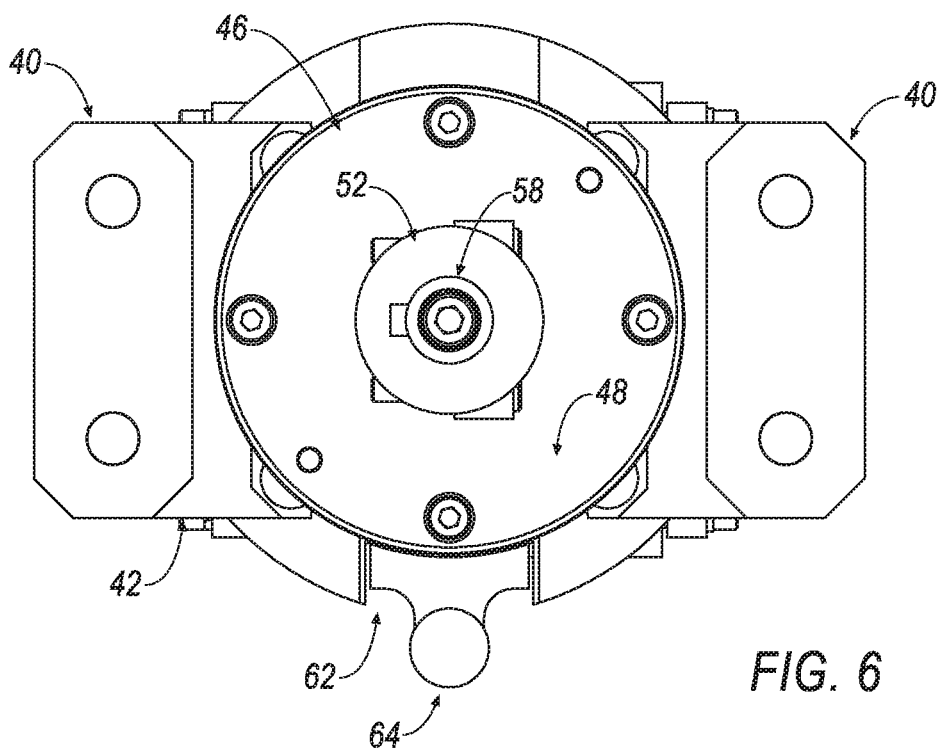
FIG. 6 generally illustrates a top view of an embodiment of a gripper assembly generally illustrating aspects of the present disclosure.

As generally illustrated in FIGS. 1 and 6, an encoder 46 may include a receiving portion 58. The receive portion 58 may be configured to receive a component associated with a container and/or bottle conveyor or handling device. For example, and without limitation, a bottle conveyor or handling device may include an insert configured to be inserted into the receiving portion 58. The insert may be in communication with a controller associated with the bottle conveyor or handling device. In embodiments, the insert may be selectively controlled by the controller. For example, and without limitation, the controller may instruct an insert to rotate about a vertical axis. The controller may instruct the insert to rotate until a container and/or bottle gripped by the grippers is in a desired position. The central shaft 22 may rotate in response to the insert being rotated. In this manner, an encoder 46, a spindle 16, and a gripper 24 may rotate substantially in tandem in response to the controller instructing the insert to rotate.

In embodiments, an encoder ring 50 may be include an incremental encoder and/or other suitable encoder. The encoder ring 50 may be configured to provide position feedback associated with the encoder ring 50. For example, and without limitation, the encoder ring 50 may include a plurality of position indicators 60. The position indicators 60 may indicate a relative position of the encoder ring 50. In embodiments, the relative position of the encoder ring 50 may correspond to a relative position of the spindle 16. That is, a position of the position indicators 60 may correspond to a position of the spindle 16.

In embodiments, a bottle conveyor or handling device may include an encoder reader. The encoder reader may include an optical reading device, and/or other suitable encoder reading device, configured to determine a position of a spindle 16 based on a position of the position indicators 60. The encoder reader may communicate a position of the spindle 16 to the controller. The controller may instruct the insert to rotate in response to the received position of the spindle 16. In this manner, a bottle loaded and/or gripped in the gripper 24 may be rotated to a desired position. For example, and without limitation, the assembly 10 may be conveyed by a bottle conveyor or handling device to a printing station. The spindle 16 may be rotated such that a bottle loaded into the gripper 24 is properly aligned with respect to a device, such as a printer.

Figure 4A:
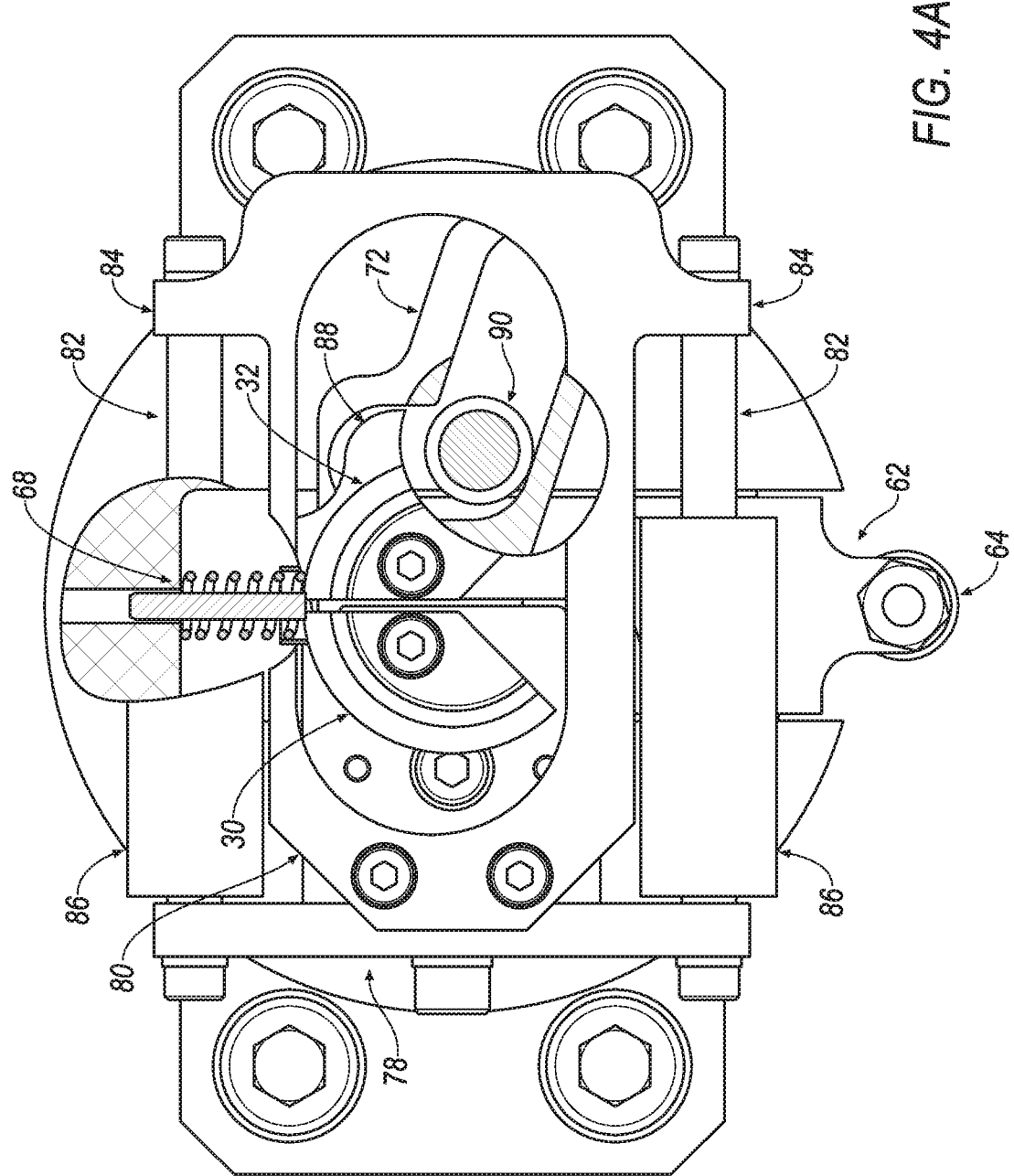
FIG. 4A generally illustrates a bottom view of an embodiment of a gripper assembly generally illustrating aspects of the present disclosure.

In embodiments, a spindle 16 may include an actuating plate 62 and a cam follower 64. The cam follower 64 may be disposed on a portion of the actuating plate 62. The cam follower 64 may be attached to the actuating plate 62 via a fastener 66. A fastener 66 may be configured to engage a shaft associated with the cam follower 64. The actuating plate 62 may be disposed on the second side 20 of the spindle 16. In embodiments, the actuating plate 62 may be configured to actuate and/or slide in a direction that is substantially perpendicular to the central shaft 22. The actuating plate 62 may be mounted on a linear ball bearing carriage and rail system. The spindle 16 may include a biasing spring 68, as generally illustrated in FIG. 4A. The biasing spring 68 may include a compression spring and/or other suitable spring. The biasing spring 68 may be configured to bias the actuating plate 62 outward away from the central shaft 22.

In embodiments, the assembly 10 may be conveyed through various bottle processing stations, as described. A component of the a bottle processing station may be configured to engage the cam follower 64. For example, and without limitation, an actuating component of the processing station may apply a force on the cam follower 64 in the direction of the central shaft 22. The cam follower 64 may be configured to connect and/or engage with the actuating component. The actuating component may apply a force that is greater than a biasing force applied on the actuating plate 62 by a biasing mechanism, such as a biasing spring 68. The actuating plate 62 may actuate toward the central shaft 22 in response to the force being applied to the cam follower 64. The actuating plate 62 may move away from the central shaft 22 when the force being applied to the cam follower 64 is less than the biasing force applied to the actuating plate 62 by the biasing spring 68.

Figure 4B:
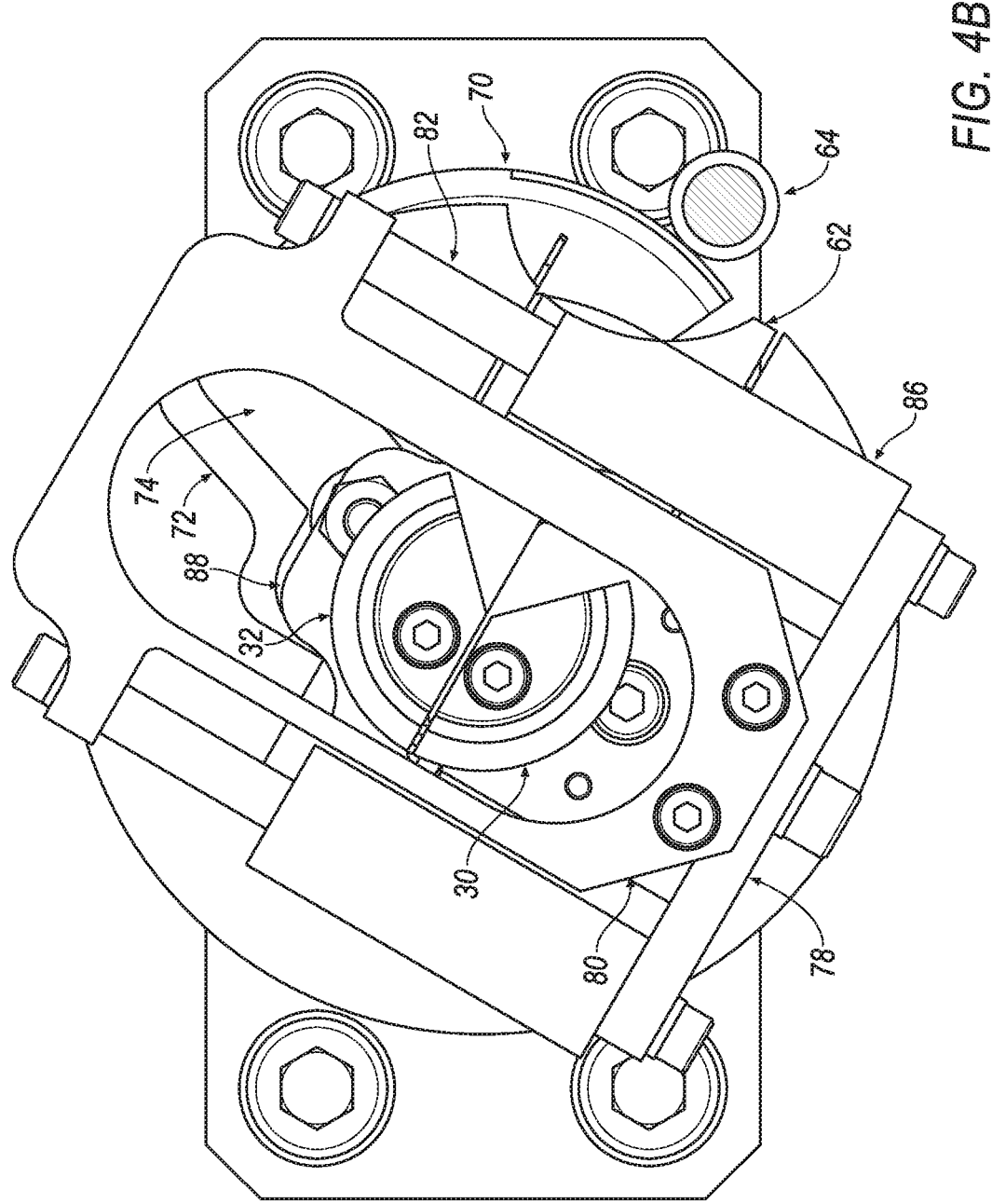
FIG. 4B generally illustrates a bottom view of an embodiment of a gripper assembly partially rotated toward a locked position.

In embodiments, the assembly 10 may include a locking cam 70. The locking cam 70 may be attached and/or connected to the bearing plate 42. The locking cam 70 may extend away from the bearing plate 42 toward the spindle 16. In embodiments, a locking cam 70 may be configured to engage and/or make contact with the cam follower 64. For example, and without limitation, the spindle 16 may rotate, as described. As generally illustrated in FIG. 4B, the cam follower 64 may make contact with the locking cam 70 in response to the spindle 16 rotating. The cam follower 64 may be forced outward away from the central shaft 22 in response to the cam follower 64 making contact with the locking cam 70. The actuating plate 62 may be actuated away from the central shaft 22 in response to the cam follower 64 being forced outward away from the central shaft 22.

Figure 11:
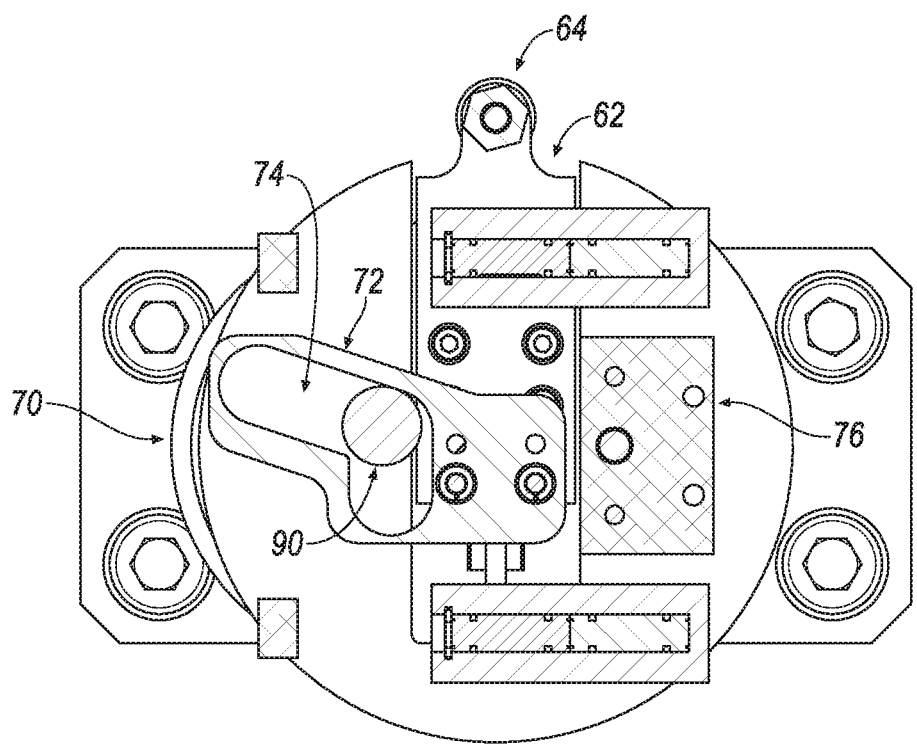
FIG. 11 generally illustrates a partial cross-sectional bottom view of an embodiment of a gripper assembly including a cam plate generally illustrating aspects of the present disclosure.

In embodiments, the bracket 28 may include a cam plate 72, as generally illustrated in FIGS. 3 and 11. The cam plate 72 may be attached and/or connected, such as, to the actuating plate 62 via one or more fasteners. The fasteners may include, but are not limited to, socket head cap screws, screws, pins, dowel pins, rivets, weld joints, and/or other suitable fasteners. The cam plate 72 may include a follower track 74. The follower track 74 may comprise a recess, aperture and/or cutaway portion of the cam plate 72.

Figure 7:
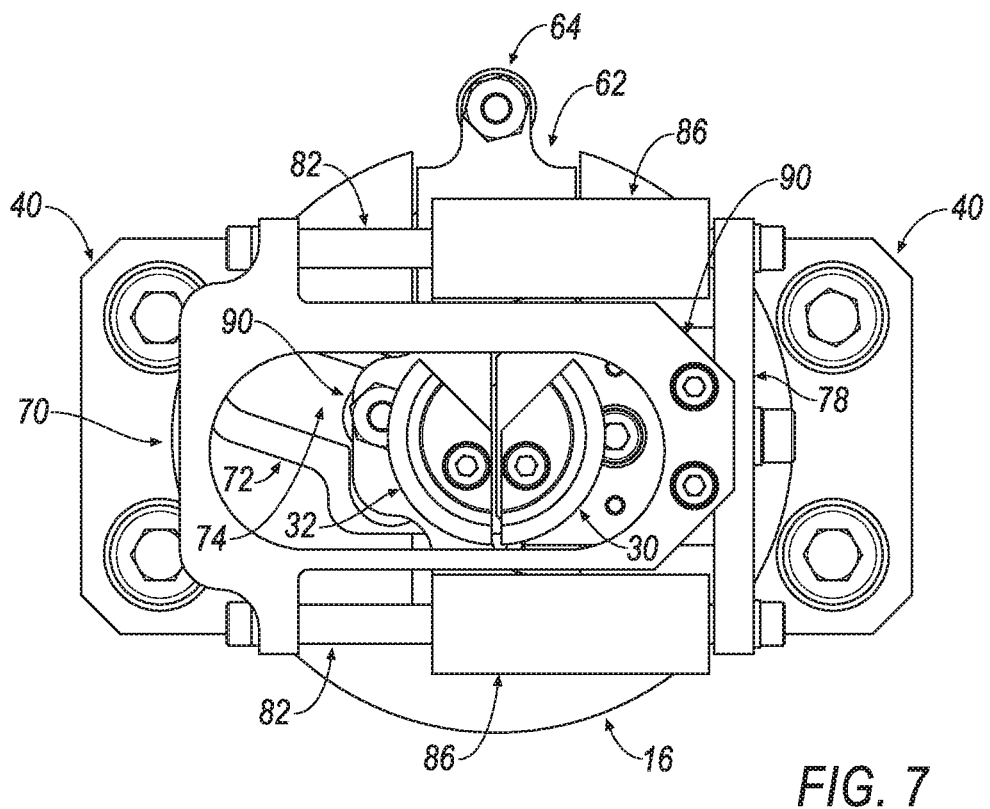
FIG. 7 generally illustrates a bottom view of an embodiment of a gripper assembly generally illustrating aspects of the present disclosure.

In embodiments, the bracket 28 may include a standoff 76. The standoff 76 may be attached and/or connected to a tie bar and/or cross member 78, such as generally illustrated in FIGS. 4A and 7. Additionally, or alternatively, the standoff 76 may be attached and/or connected to an upper portion 80 of the bracket 28. As described, a gripper 24 may be attached and/or connected to a portion of the bracket 28. The gripper 24 may include a first jaw 30 and a second jaw 32. In embodiments, the first jaw 30 may be attached and/or connected to the standoff 76. The first jaw 30 may be attached and/or connected to the standoff 76 via one or more fasteners. The fasteners may include, but are not limited to, socket head cap screws, screws, pins, dowel pins, rivets, weld joints, and/or other suitable fasteners. In embodiments, the first jaw 30 may be a stationary portion of the gripper 24.

In embodiments, a bracket 28 may include one or more guide shafts 82. The one or more guide shafts 82 may extend between the cross member 78 and the upper portion 80. The upper portion 80 may include one or more projections 84. The one or more projections 84 may extend away from the upper portion 80. In embodiments, the one or more projections 84 may substantially align with the cross member 78. In embodiments, the one or more guide shafts 82 may include a corresponding bearing housing 86. The bearing housings 86 may include a plurality of ball bearings configured to roll and/or slide along corresponding guide shafts 82.

In embodiments, a bracket 28 may include bridge plate 88. The bridge plate 88 may extend between the bearing housings 86. The second jaw 32 may be attached and/or connected to the bridge plate 88 via one or more fasteners. The fasteners may include, but are not limited to, socket head cap screws, screws, pins, dowel pins, rivets, weld joints, and/or other suitable fasteners. The bridge plate 88 may include a cam follower 90 The cam follower 90 may be positioned within the follower track 74. The cam plate 72 may be configured to actuate and/or slide the cam follower 90 away from the central shaft 22. As described, the cam plate 72 may be attached and/or connected to the actuating plate 62. As the actuating plate 62 is actuated toward the central shaft 22 (e.g., in response to the cam follower 64 being acted upon by a component of a processing station), the cam plate 72 may be actuated toward the central shaft 22.

A cam follower 90 may be positioned within the follower track 74. The follower track 74 may be configured to guide the cam follower 90 away from the central shaft 22 as cam plate 72 is being actuated toward the central shaft 22. The bridge plate 88 may be pulled and/or slid away from the central shaft 22, in response to the cam follower 90 being guided by the follower track 74. As the bridge plate 88 is pulled and/or slid away from the central shaft 22, the bearing housings 86 may roll and/or slid along the guide shafts 82. The second jaw 32 may be pulled and/or slid away from the first jaw 30 in response to the bridge plate 88 being pulled and/or slid away from the central shaft 22.

For example, and without limitation, an assembly 10 may be conveyed and/or provided to a bottle loading station associated with a bottle processing line. As described, a component of the bottle loading station may apply a force on the cam follower 64. The actuating plate 62 may be actuated toward the central shaft 22 in response to the force being applied to the cam follower 64. The cam plate 72 may be actuated toward the central shaft 22 in response to the actuating plate 62 being actuated. The cam follower 90 may be guided by the follower track 74 in response to the cam plate 72 being actuated. As generally illustrated in FIG. 4D, the second jaw 32 may be pulled and/or slid away from the first jaw 30 in response to the cam follower 90 being guided by the follower track 74. A portion of a bottle may be inserted into a space between the first jaw 30 and the second jaw 32 by a bottle loading component of a bottle loading station.

The force applied to the cam follower 64 may be reduced and/or removed. The actuating plate 62 may be actuated away from the central shaft 22 in response to a biasing force being applied by the biasing spring 68 on the actuating plate 62. The cam plate 72 may be pulled and/or forced away from the central shaft 22 by the actuating plate 62. The cam follower 90 may be guided by the follower track 74 toward the central shaft 22. The second jaw 32 may be pulled and/or slid toward the first jaw 30 in response to the cam follower 90 being guided by the follower track 74. The bottle inserted into the space between the first jaw 30 and the second jaw 32 may be gripped and/or held by the first jaw 30 and the second jaw 32.

Figure 4C:
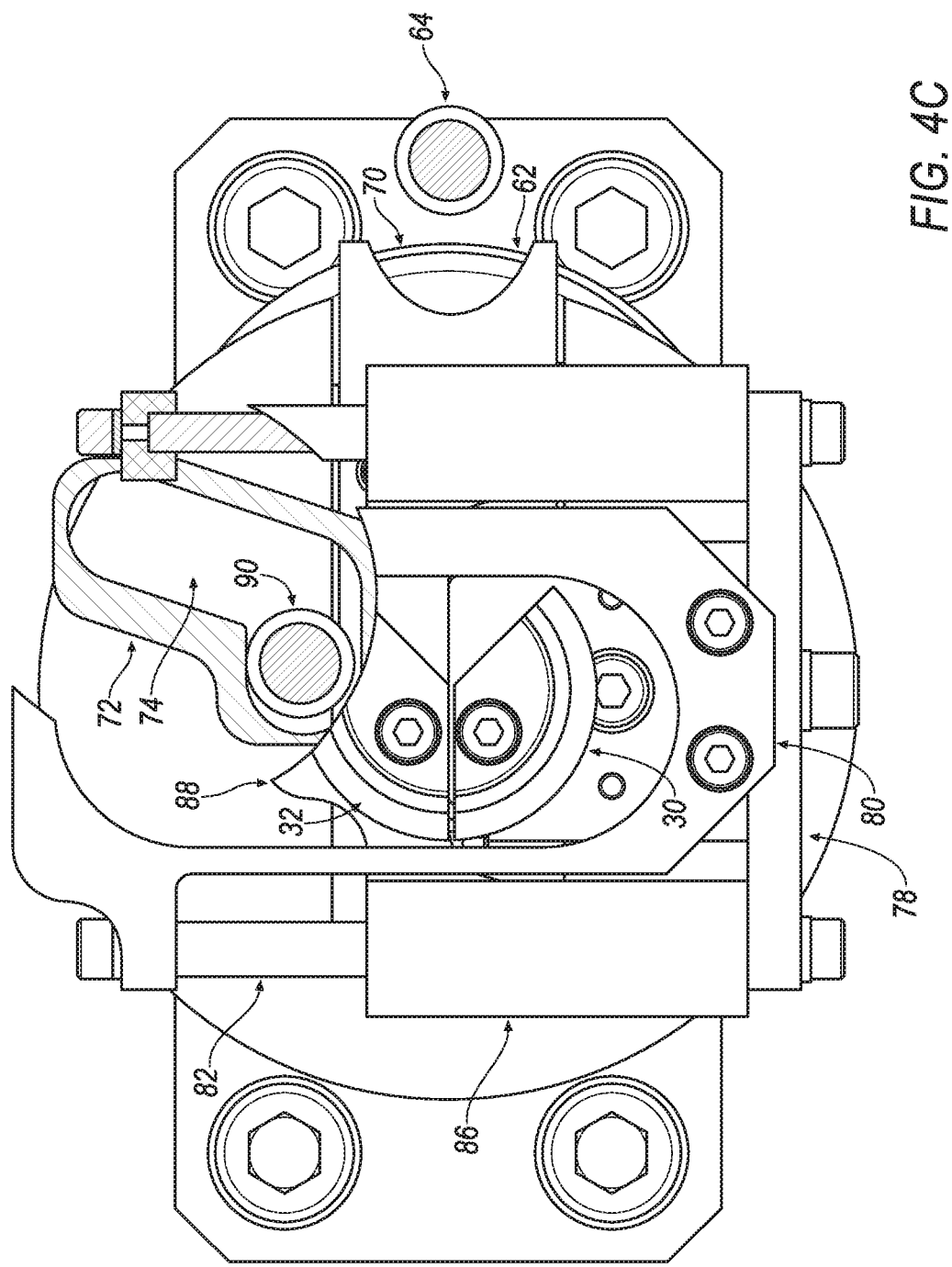
FIG. 4C generally illustrates a bottom view of an embodiment of a gripper assembly rotated to a locked position.
Figure 4D:
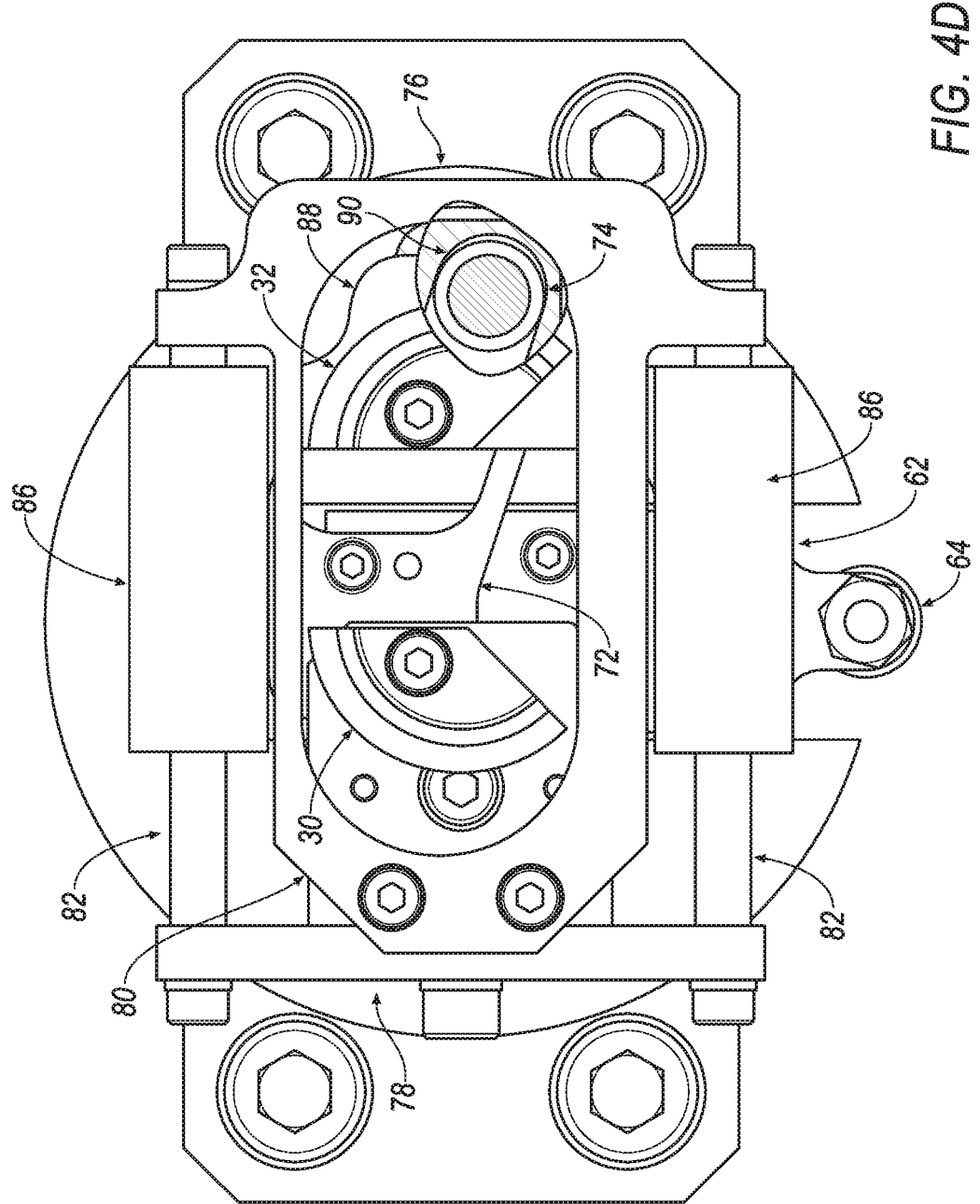
FIG. 4D generally illustrates a bottom view of an embodiment of a gripper assembly including a gripper element in an opened position.

As generally illustrated in FIGS. 4B and 4C, a spindle 16 may be rotated such that the cam follower 64 makes contact with the locking cam 70 The locking cam 70 may be configured to pull the cam follower 64 away from the central shaft 22 when the cam follower 64 makes contact with the locking cam 70. As the cam follower 64 is pulled away from the central shaft 22, the second jaw 32 may be pulled and/or slid toward the first jaw 30. The spindle 16 may be rotated to a locked position as generally illustrated in FIG. 4C. The locking cam 70 may be configured to limit and/or prevent movement of the cam follower 64 in the direction of the central shaft 22. For example, and without limitation, as the assembly 10 is conveyed through various bottle processing stations, the cam follower 64 may be incidentally acted upon and/or actuated toward the central shaft 22. The locked cam 70 may prevent the cam follower 64 from actuating toward the central shaft 22, thereby preventing the second jaw 32 from being pulled and/or slid away from the first jaw 30 as described above. In this manner, the bottle is locked into the gripper 24.

Figure 5:
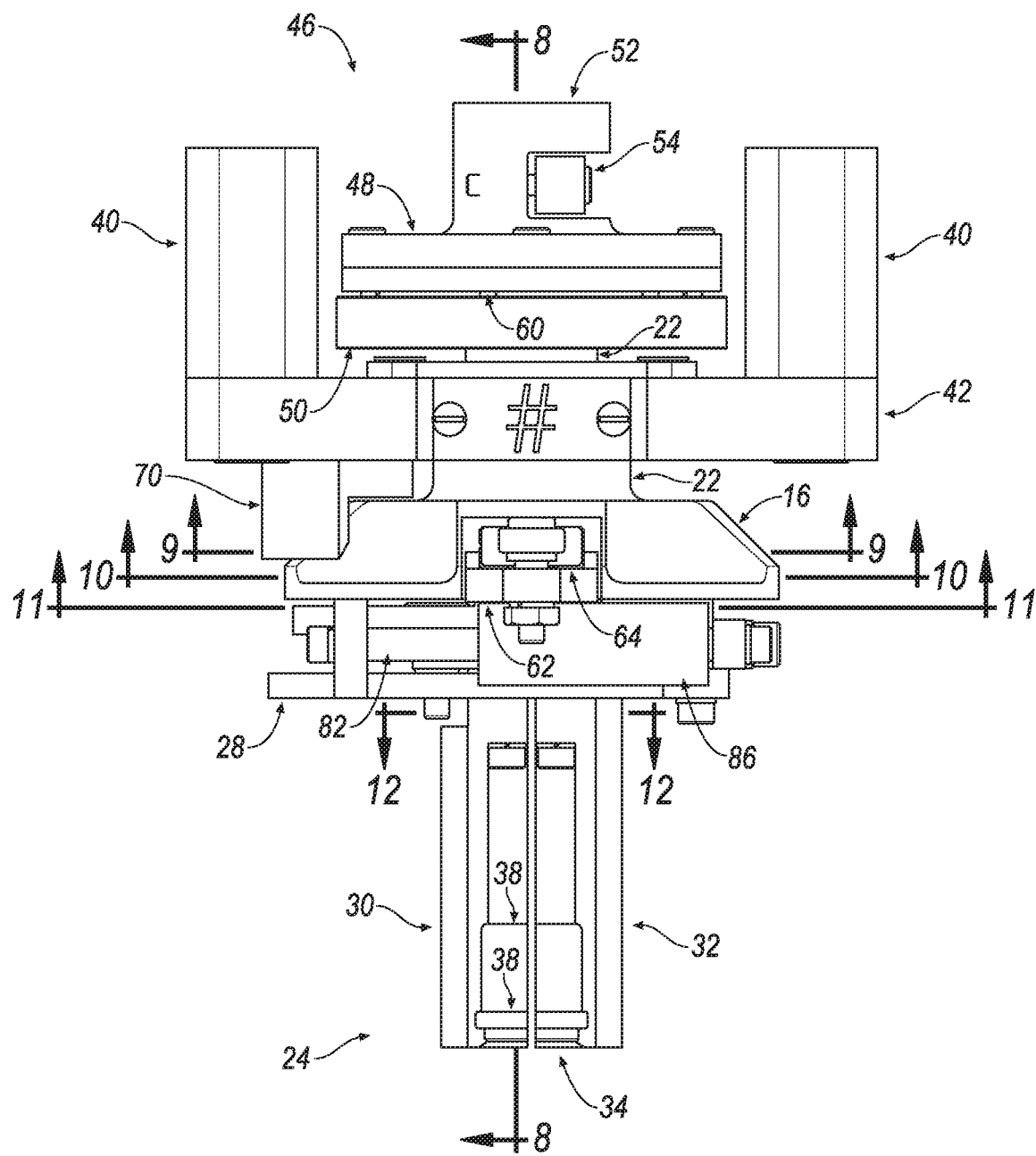
FIG. 5 generally illustrates a front view of an embodiment of a gripper assembly generally illustrating aspects of the present disclosure.
Figure 8:
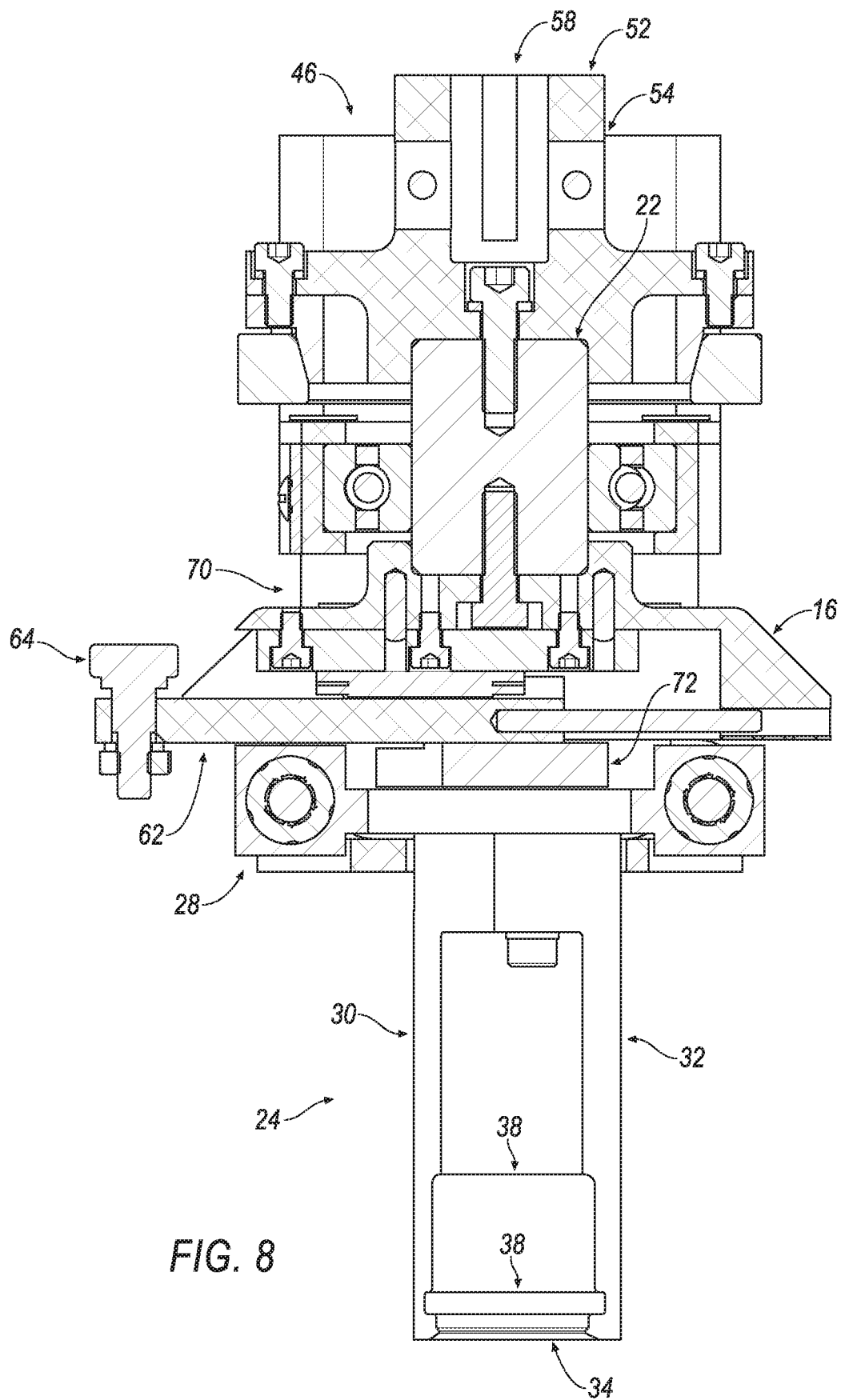
FIG. 8 generally illustrates a cross-sectional side view of an embodiment of a gripper assembly generally illustrating aspects of the present disclosure.
Figure 9:
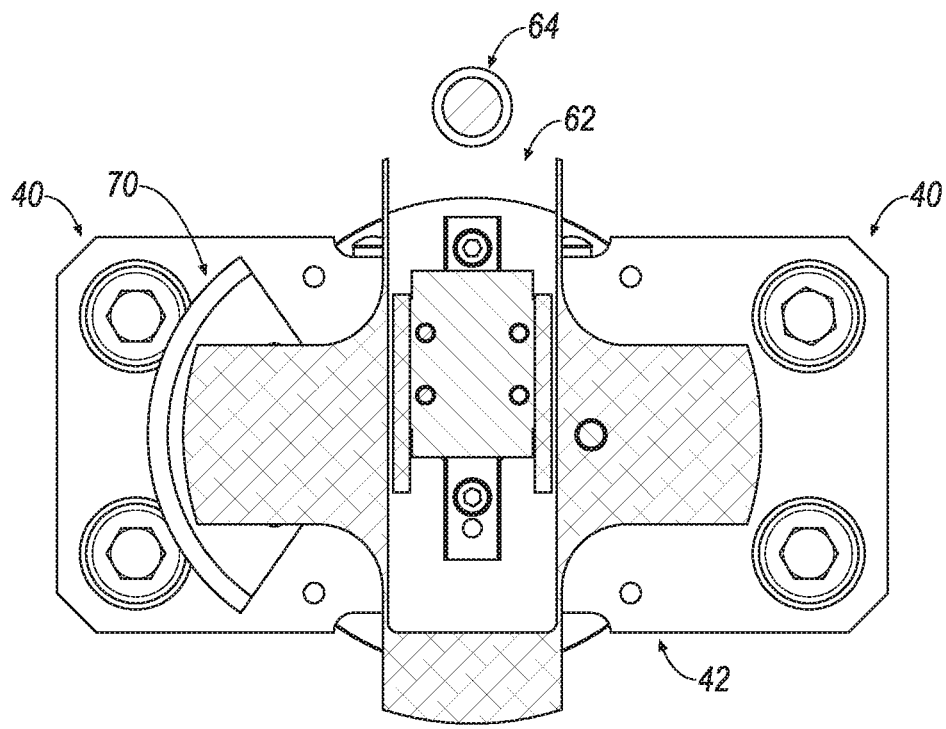
FIG. 9 generally illustrates a partial cross-sectional bottom view of an embodiment of a gripper assembly generally illustrating aspects of the present disclosure.
Figure 10:
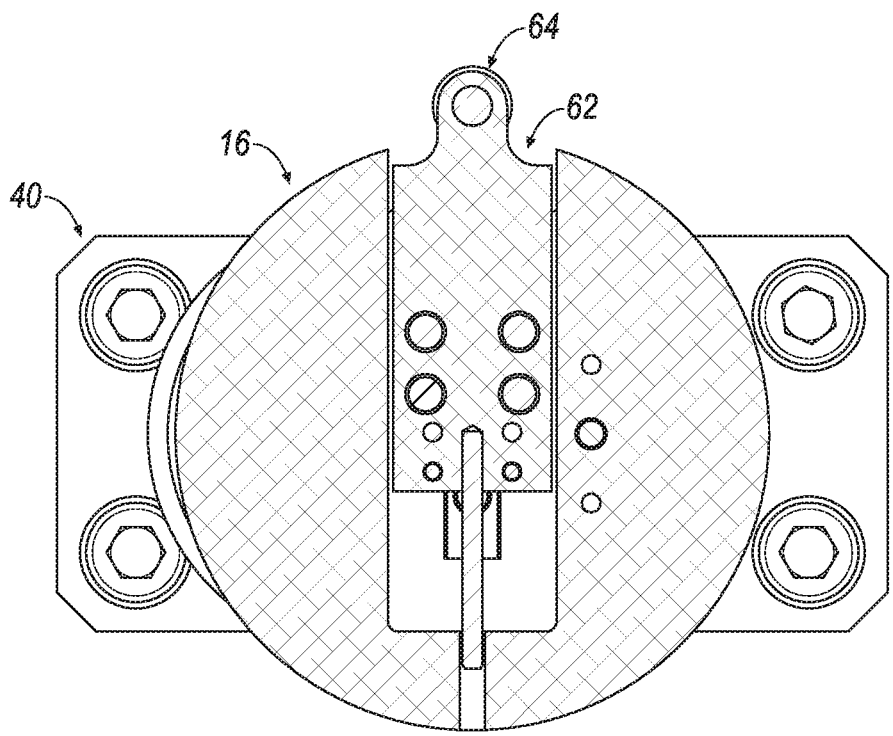
FIG. 10 generally illustrates a partial cross-sectional bottom view of an embodiment of a gripper assembly generally illustrating aspects of the present disclosure.
Figure 12:
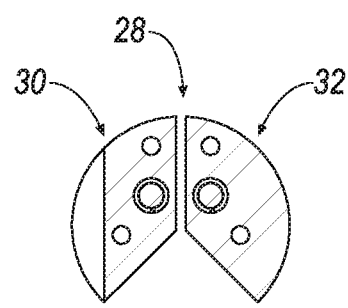
FIG. 12 generally illustrates a cross-sectional view of an embodiment of a gripper element generally illustrating aspects of the present disclosure.

FIG. 5 generally illustrates a side view of a gripper assembly, including cross-section reference lines, embodying principles of the present disclosure. FIG. 8 generally illustrates a vertical cross-sectional view of a gripper assembly taken about line 8 as generally illustrated in FIG. 5. FIG. 9 generally illustrates a horizontal cross-sectional view of a gripper assembly taken about line 9 as generally illustrated in FIG. 5. FIG. 10 generally illustrates a horizontal cross-sectional view of a gripper assembly taken about line 10 as generally illustrated in FIG. 5. FIG. 11 generally illustrates a horizontal cross-sectional view taken about line 11 as illustrated in FIG. 5. FIG. 12 generally illustrates a horizontal cross-sectional view of a gripper element taken about line 12 as illustrated in FIG. 5.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although only certain embodiments have been described above with a certain degree of particularity, those skilled in the art could make numerous alterations to the disclosed embodiments without departing from the scope of this disclosure. Joinder references (e.g., attached, coupled, connected, and the like) are to be construed broadly and may include intermediate members between a connection of elements, relative movement between elements, physical connections (e.g., fluid connections), and/or electrical connections (wired and/or wireless). As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

What is claimed is:

1. A gripper assembly for gripping a portion of a container, comprising:
   a spindle configured to rotate about a vertical axis;
   an actuating plate disposed on or about the spindle, the actuating plate configured to actuate toward a central shaft in response to a force applied to a first cam follower;
   a gripper configured to at least one of open and close in response to the actuating plate being actuated toward the central shaft; and a locking cam configured to contact the first cam follower and in at least one position to limit movement of the actuating plate toward the central shaft.

2. The gripper assembly of claim 1, including a spring configured to bias the actuating plate away from the central shaft.

3. The gripper assembly of claim 1, including a bracket configured to support the gripper.

4. The gripper assembly of claim 1, wherein the gripper includes a first jaw and a second jaw.

5. The gripper assembly of claim 4, wherein the second jaw is configured move or translate away from the first jaw in response to the actuating plate being actuated toward the central shaft.

6. The gripper assembly of claim 4, including a cam plate disposed on the actuating plate, the cam plate including a follower track.

7. The gripper assembly of claim 6, wherein the second jaw includes a second cam follower.

8. The gripper assembly of claim 7, wherein the follower track is configured to guide the second cam follower away from the central shaft in response to the actuating plate being moved or translated toward the central shaft.

9. The gripper assembly of claim 1, including an encoder ring configured to indicate a position of the spindle.

10. A gripper assembly for gripping a portion of a container, comprising:
    a spindle configured to rotate about a vertical axis;
    an actuating plate disposed on or about the spindle, the actuating plate configured to actuate toward a central shaft in response to a force applied to a first cam follower;
    a gripper configured to grip a portion of a container, the gripper including a pair of jaws configured to at least one of open and close in response to the actuating plate being actuated toward the central shaft; and
    a locking cam configured to contact the first cam follower and in at least one position to limit movement of the actuating plate toward the central shaft.

11. The gripper assembly of claim 10, including a spring configured to bias the actuating plate away from the central shaft.

12. The gripper assembly of claim 10, including a cam plate configured to guide a second cam follower associated with at least one of the jaws away from the central shaft.

13. The gripper assembly of claim 12, wherein the jaws are configured to open in response to the second cam follower being guided by the cam plate.

14. The gripper assembly of claim 10, including an encoder ring configured to indicate a position of the spindle.

15. The gripper assembly of claim 14, wherein the spindle is configured to be selectively rotated based on an identified or designated position.

16. A gripper assembly for gripping a portion of a container, comprising:
    a spindle configured to rotate about a vertical axis;
    an actuating plate disposed on or about the spindle, the actuating plate configured to actuate toward a central shaft in response to a force applied to a first cam follower;
    a gripper configured to grip a portion of a container, the gripper including a first jaw and a second jaw;
    a cam plate configured to guide a second cam follower associated with one of the first jaw and the second jaw away from the central shaft in response to the actuating plate being actuated toward the central shaft; and
    a locking cam configured to contact the first cam follower and to limit movement of the actuating plate toward the central shaft.

17. The gripper assembly of claim 16, wherein the portion of the container includes neck portion of the container.

18. The gripper assembly of claim 16, wherein the second cam follower is positioned within a follower track associated with the cam plate.

19. The gripper assembly of claim 16, including an encoder configured to indicate a position of the spindle.

20. The gripper assembly of claim 19, wherein the spindle is configured to be selectively rotate based on an identified or designated position.

* * * * *